United States Patent
Burroughs et al.

(10) Patent No.: US 7,111,158 B1
(45) Date of Patent: Sep. 19, 2006

(54) TECHNIQUES FOR TRANSITIONING CONTROL OF A SERIAL ATA DEVICE AMONG MULTIPLE HOSTS USING SLEEP AND WAKE COMMANDS

(75) Inventors: John V. Burroughs, Mason, MA (US); David F. Ouellette, Riverside, RI (US); Robert W. Beauchamp, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 409 days.

(21) Appl. No.: 10/745,732

(22) Filed: Dec. 24, 2003

(51) Int. Cl.
   *G06F 15/177* (2006.01)
   *G06F 13/00* (2006.01)

(52) U.S. Cl. .......................... 713/1; 710/74; 711/114; 713/310

(58) Field of Classification Search ............. 713/1, 713/310; 711/114; 714/1; 710/58, 74
   See application file for complete search history.

(56) References Cited

U.S. PATENT DOCUMENTS

| | | | |
|---|---|---|---|
| 6,301,625 B1* | 10/2001 | McDonald et al. ............. | 710/5 |
| 6,381,675 B1* | 4/2002 | Okada ........................ | 711/114 |
| 6,542,954 B1* | 4/2003 | Aruga ........................ | 710/316 |
| 6,654,831 B1* | 11/2003 | Otterness et al. ............. | 710/74 |
| 6,915,381 B1* | 7/2005 | Fujie et al. .................. | 711/114 |
| 6,993,610 B1* | 1/2006 | Coffey et al. ................ | 710/74 |
| 7,028,199 B1* | 4/2006 | Ayyavu et al. ............... | 713/323 |
| 2003/0221061 A1* | 11/2003 | El-Batal et al. ............. | 711/114 |
| 2004/0088441 A1* | 5/2004 | Chiang et al. ............... | 710/1 |
| 2004/0117545 A1* | 6/2004 | Borsini et al. .............. | 711/112 |
| 2004/0193737 A1* | 9/2004 | Huffman et al. ............. | 710/1 |
| 2005/0138441 A1* | 6/2005 | Huffman et al. ............. | 713/300 |
| 2005/0251588 A1* | 11/2005 | Hoch et al. .................. | 710/5 |

OTHER PUBLICATIONS

Serial ATA: High Speed Serialized ATA Attachment, Revision 1.0a, Jan. 7, 2003, APT Technologies, Inc., Dell Computer Corporation, Intel Corporation, Maxtor Corporation, Seagate Technology, pp. 1-310.
Serial ATA II: Extensions to Serial ATA 1.0a, Revision 1.1, Oct. 9, 2003, Dell Computer Corporation, Intel Corporation, Maxtor Corporation, Vitesse Semiconductor Corporation.

* cited by examiner

*Primary Examiner*—Chun Cao
(74) *Attorney, Agent, or Firm*—BainwoodHuang (57) ABSTRACT

A system has a Serial ATA device and a subsystem. The subsystem includes multiple hosts, and a communications medium which interconnects the hosts to the device. The hosts are configured to share control of the device through the communications medium. First and second hosts, when transitioning control of the device, are configured to (i) send a sleep command from the first host to the device, the sleep command directing the device to transition from a normal operating mode to a sleep mode, (ii) provide a notification signal from the first host to the second host, the notification signal indicating that the first host has released control of the device to the second host, and (iii) send a wake command from the second host to the device in response to the notification signal, the wake command directing the device to transition from the sleep mode to the normal operating mode.

20 Claims, 5 Drawing Sheets

TECHNIQUES FOR TRANSITIONING CONTROL OF A SERIAL ATA DEVICE AMONG MULTIPLE HOSTS USING SLEEP AND WAKE COMMANDS

BACKGROUND

A typical Serial ATA system includes a host, a device and a communications medium that connects the host to the device. The host typically includes processing circuitry, volatile high-speed memory, and a host-side controller or concentrator. The device is typically a data storage unit (e.g., a disk drive). The communications medium (e.g., Serial ATA communications cabling) connects the host-side controller to the device and carries signals between the host and the device in accordance with the Serial ATA interface specification. In some Serial ATA systems, the host-side controller (e.g., a host bus adapter, a RAID controller, etc.) is configured to communicate with more than one device.

For a host and a device to properly exchange information, the host-side controller establishes a communication link (i.e., Physical Layer (PHY) communication) with the device through the communications medium. Once the host-side controller establishes this communication link, the host and the device are capable of exchanging commands, status and data in accordance with a normal operating mode as specified by the Serial ATA interface specification.

To establish the communication link between the host and the device (i.e., for successful PHY initialization), the host and the device perform a Serial ATA startup sequence by exchanging a set of Out-of-Band (OOB) signals through the communications medium, i.e., a Serial ATA communications cable. These OOB signals include a COMRESET signal, a COMINIT signal, a COMWAKE signal, and ALIGN primitives. To this end, the host issues and releases the COMRESET signal on the Serial ATA communications cable. When the device detects issuance and release of the COMRESET signal, the device issues the COMINIT signal. Next, the host calibrates and issues the COMWAKE signal. The device then similarly calibrates and issues the COMWAKE signal. Following the exchange of COMWAKE signals, the host and the device output and lock onto each others ALIGN sequences. At this point, the communications link is established between the host and the device and normal communications may begin. Further details of this initialization sequence is available in a document entitled "Serial ATA: High Speed Serialized AT Attachment", Revision 1.0a, Jan. 7, 2003, the teachings of which are hereby incorporated by reference in their entirety.

Some Serial ATA systems include two hosts for fault tolerance purposes, i.e., a first host which is configured to perform normal operations and a second host which is configured to become active in place of the first host if the first host should fail. Here, the first host establishes a communications link with a device using the above-described Serial ATA startup sequence, and performs data storage operations with the device. If the first host subsequently fails, the communications link between the first host and the device is destroyed. The second host then establishes a new communications link with the device using the above-described Serial ATA startup sequence, and performs data storage operations with the device thus enabling the system as a whole to continue operation. Although the amount of time which passes between transition of control from the first host to the second host may be on the order of several hundred milliseconds to a few seconds, this amount of time is typically deemed satisfactory since the benefit of continued system operation outweighs the loss of system availability during this amount of time.

SUMMARY

Unfortunately, there are deficiencies to the above-described conventional Serial ATA startup sequence. For example, the conventional Serial ATA startup sequence is not well-suited for coordinating control of a device among multiple hosts operating in an active—active manner (i.e., multiple hosts concurrently performing data storage operations for higher throughput). To understand this point better, it should be understood that a Serial ATA device is capable of establishing a communication link with only one host at a time. During that time, that host has exclusive control over the device by virtue of the established communication link and thus is the only host capable of exchanging data with that device.

If a second host wishes to exchange data with that device using the above-described Serial ATA startup sequence, the first host must terminate communication with the device and the second host must carry-out the Serial ATA startup sequence with the device to establish a new communication link. As mentioned earlier, the latency for performing the above-described Serial ATA startup sequence is on the order of several hundred milliseconds to a few seconds which generally is too long to enable the system to provide adequate data storage response times for a system operating in an active—active manner.

In contrast to the above-described conventional Serial ATA startup sequence, embodiments of the invention are directed to techniques for transitioning control of a Serial ATA device between hosts using sleep and wake commands that temporarily move the device between a sleep mode and a normal operating mode. Although the sleep commands (e.g., "partial", "slumber", etc.) are typically prescribed by the Serial ATA interface specification for power management purposes (e.g., for putting a Serial ATA device into a partial quiescent state or a slumber state to reduce power consumption/dissipation), the use of such commands for transitioning device control between hosts in active—active configurations alleviates the need for the Serial ATA device to reinitialize itself, alleviates the need for a host to reinitialize device features (i.e., a host does not need to set features to the device), and guarantees the Serial ATA device to be ready in a substantially short amount of time (e.g., 10 microseconds for "partial", 10 milliseconds for "slumber", etc.) as per the Serial ATA interface specification.

One embodiment of the invention is directed to a data storage system having a Serial ATA device and a control subsystem. The control subsystem includes a first host, a second host, and a communications medium which interconnects the first and second hosts to the Serial ATA device. The first and second hosts are configured to share control of the Serial ATA device through the communications medium. The first and second hosts, when transitioning control of the Serial ATA device, are configured to (i) send a sleep command from the first host to the Serial ATA device, the sleep command directing the Serial ATA device to transition from a normal operating mode to a sleep mode, (ii) provide a notification signal from the first host to the second host, the notification signal indicating that the first host has released control of the Serial ATA device to the second host, and (iii) send a wake command from the second host to the Serial ATA device in response to the notification signal, the wake command directing the Serial ATA device to transition from the sleep mode to the normal operating mode. Accordingly, control of the Serial ATA device is capable of transitioning smoothly from the first host to the second host without having to reinitialize the Serial ATA device which requires significantly more time.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for transitioning control of a Serial ATA device between multiple hosts using sleep and wake commands that temporarily move the device between a sleep mode and a normal operating mode. These sleep commands (e.g., "partial", "slumber", etc.) are typically prescribed by the Serial ATA interface specification to reduce power consumption/dissipation. However, the use of such sleep commands for sharing device control within active—active configurations alleviates the need for the Serial ATA device to reinitialize itself, alleviates the need for a host to reinitialize device features (i.e., a host does not need to set features to the device), and guarantees the Serial ATA device to be ready in a significantly short amount of time (e.g., 10 microseconds for "partial", 10 milliseconds for "slumber", etc.) in accordance with the Serial ATA interface specification.

Figure 1:
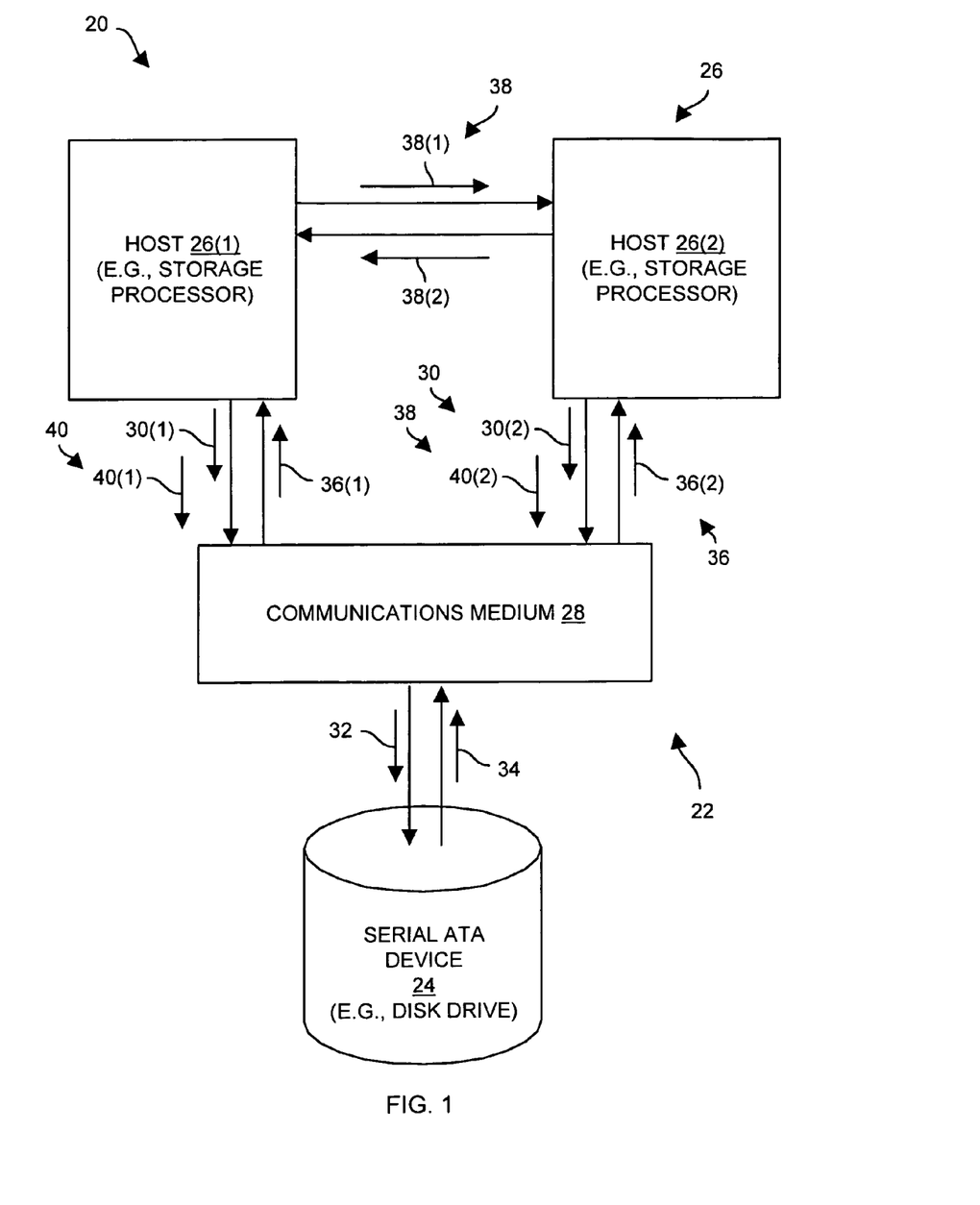
FIG. 1 is a block diagram of a data storage system which is suitable for use by the invention.

FIG. 1 shows a data storage system 20 which is suitable for use by the invention. The data storage system 20 includes a control subsystem 22 and a Serial ATA device 24 (e.g., a disk drive). The control subsystem 22 includes a first host 26(1), a second host 26(2) (collectively, hosts 26), and a communications medium 28 which interconnects the hosts 26 to the Serial ATA device 24.

The hosts 26 are configured to share control of the Serial ATA device 24 through the communications medium 28. Only one host 26 has control of the Serial ATA device 24 at any given time through an established communication link. The host 26 currently having control of the Serial ATA device 24 is the only host 26 that is capable of exchanging data with the Serial ATA device 24 at that moment.

As will be explain in further detail shortly, the hosts 26 coordinate control of the Serial ATA device 24 by transitioning the Serial ATA device 24 back and forth between a normal mode to a sleep mode. When the Serial ATA device 24 is put into the sleep mode, control of the Serial ATA device 24 is capable of switching from one host 26 (e.g., the host 26(1)) to another host 26 (e.g., the host (26(2)). When the Serial ATA device 24 is put back into the normal operating mode, the other host 26 then has control of the Serial ATA device 24 and is capable of exchanging data with the device 24.

The hosts 26 use sleep and wake commands to direct the Serial ATA device 24 into and out of sleep mode. Either the PARTIAL command or the SLUMBER command of the Serial ATA interface specification are suitable for use as the sleep command. The SLUMBER command causes the PHY layer to transition into a slumber power management state in which the PHY logic is powered but in a reduced power state with an exit latency of no longer than 10 milliseconds. Similarly, the PARTIAL command causes the PHY layer to transition into a partial power management state in which the PHY logic is powered but in a reduced power state with an exit latency of no longer than 10 microseconds. The COMWAKE command directs the Serial ATA device 24 out of the sleep mode (i.e., either the slumber power management state or the partial power management state) back to normal operating mode. Of course, the use of the PARTIAL command is preferable over the SLUMBER command since the exit latency from the partial power management state is significantly shorter. However, with either command, the exit latency is significantly shorter than that experienced with the use of the COMRESET command. Further details of these commands is available in the Serial ATA interface specification, i.e., "Serial ATA: High Speed Serialized AT Attachment", Revision 1.0a, Jan. 7, 2003, which has been incorporated by reference herein in its entirety.

As just explained, such sleep/wake operation circumvents the above-described conventional Serial ATA startup sequence (i.e., the COMRESET sequence) and its associated long time latency. Rather, such sleep/wake operation robustly transitions control from one host 26 to another host 26 in a relatively short period of time, e.g., a few milliseconds at most. Thus, the use of sleep/wake commands for transitioning control between hosts 26 is better suited for active—active situations, i.e., situations in which more than one host 26 operates concurrently in order to increase the number of data storage operations (throughput) performed by the data storage system 20 as a whole. In order to later facilitate a more detailed discussion of how signals are coordinated between the various components of the system 20 to transfer control of the Serial ATA device 24, a short description of particular signals will now be provided.

As shown in FIG. 1, each host 26 is configured to send information (e.g., commands, status, data, etc.) to the Serial ATA device 24 in the form of signals 30 when that host 26 has control of the Serial ATA device 24. In turn, the communications medium 28 conveys the information to the Serial ATA device 24 in the form of signals 32. In particular, when the host 26(1) sends information to the Serial ATA device 24, the host 26(1) outputs such information in the form of signals 30(1) to the communications medium 28. Additionally, when the host 26(2) sends information to the Serial ATA device 24, the host 26(2) outputs such information in the form of signals 30(2) to the communications medium 28.

As further shown in FIG. 1, the Serial ATA device 24 is configured to send information (e.g., commands, status, data, etc.) to the controlling host 26 in the form of signals 34. In turn, the communications medium 28 conveys this information to the controlling host 26 in the form of signals 36. In particular, when the host 26(1) has control of the Serial ATA device 24, the communications medium 28 outputs the information in the form of signals 36(1) to the host 26(1). Similarly, when the host 26(2) has control of the Serial ATA device 24, the communications medium 28 outputs the information in the form of signals 36(2) to the host 26(2).

At this point, it should be understood that a variety of factors determine which host 26 currently has control of the Serial ATA device 24. In particular, such control is coordinated by mutual agreement between the hosts 26 and coordinated control of the communications medium 28. To this end, as shown in FIG. 1, the hosts 26 are configured to exchange handshaking signals 38 with each other, i.e., the host 26(1) is configured to provide a handshaking signal 38(1) to the host 38(2), and the host 26(2) is configured to provide a handshaking signal 38(2) to the host 38(1). Additionally, each host 26 is configured to provide a control signal 40 to the communications medium 28. That is, the host 26(1) is configured to provide a control signal 40(1) to the communications medium 28 and the host 26(2) is configured to provide a control signal 40(2) to the communications medium 28. As will be explained shortly, the control signals 40(1), 40(2) (collectively, control signals 40) operate to direct the communications medium to properly route signals between the Serial ATA device 24 and the host 26 currently in control of the Serial ATA device 24. Further details of how the hosts 26 share control of the Serial ATA device 24 will now be provided with reference to FIG. 2.

Figure 2:
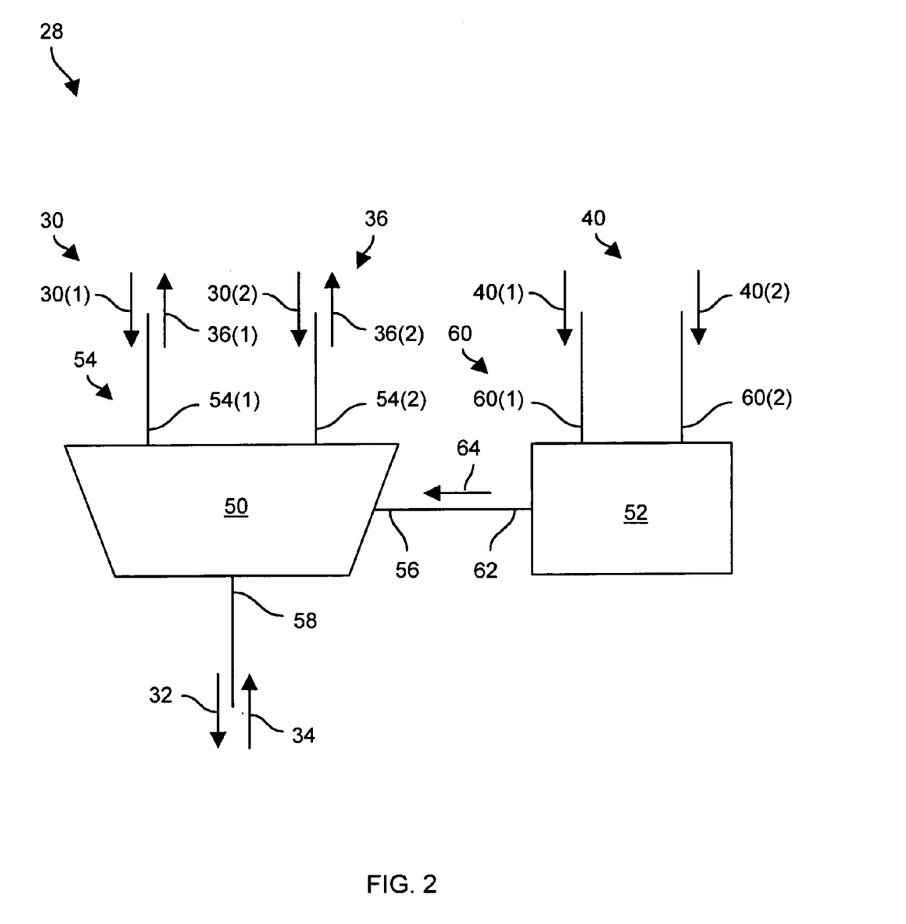
FIG. 2 is a block diagram of a portion of a communications medium of the data storage system of FIG. 1.

FIG. 2 shows particular details of the communications medium 28. As shown, the communications medium 28 includes a multiplexer circuit 48 formed by a multiplexer 50 and a control circuit 52. The multiplexer 50 includes a first host port 54(1), a second host port 54(2) (collectively, host ports 54), a control input 56 and a device port 58.

Each host port 54 is configured to connect to a respective host 26 (also see FIG. 1). In particular, the first host port 54(1) connects to the host 26(1), and the second host port 54(2) connects to the host 26(2). Accordingly, the signals 30(1), 36(1) carrying information between the host 26(1) and the communications medium 28 pass through the first host port 54(1). Likewise, the signals 30(2), 36(2) carrying information between the host 26(2) and the communications medium 28 pass through the first host port 54(2).

Similarly, the device port 58 is configured to connect to the Serial ATA device 24 (also see FIG. 1). Accordingly, the signals 32, 34 carrying information between the communications medium 28 and the Serial ATA device 24 pass through the device port 58.

As further shown in FIG. 2, the control circuit 52 includes a first input 60(1), a second input 60(2) (collectively, inputs 60), and an output 62. The inputs 60 operate as a control interface and are configured to connect to a respective host 26. In particular, the first input 60(1) connects to the host 26(1) and receives the control signal 40(1) from the host 26(1). Similarly, the second input 60(2) connects to the host 26(2) and receives the control signal 40(2) from the host 26(2). The output 62 of the control circuit 52 connects to the input 56 of the multiplexer 50 and is configured to output a multiplexer signal 64 to the multiplexer 50.

The multiplexer signal 64 controls the operation of the multiplexer 50, i.e., controls whether the multiplexer 50 selectively provides communication pathways between the host port 54(1) and the device port 58 to connect the host 26(1) with the Serial ATA device 24 or communications pathways between the host port 54(2) and the device port 58 to connect the host 26(2) with the Serial ATA device 24. The multiplexer signal 64 is based on the control signals 40 from the hosts 26 thus enabling the hosts 26 to coordinate switching of the multiplexer circuit 50 and share access to the Serial ATA device 24. Further details of the invention will now be provided with reference to FIG. 3.

Figure 3:
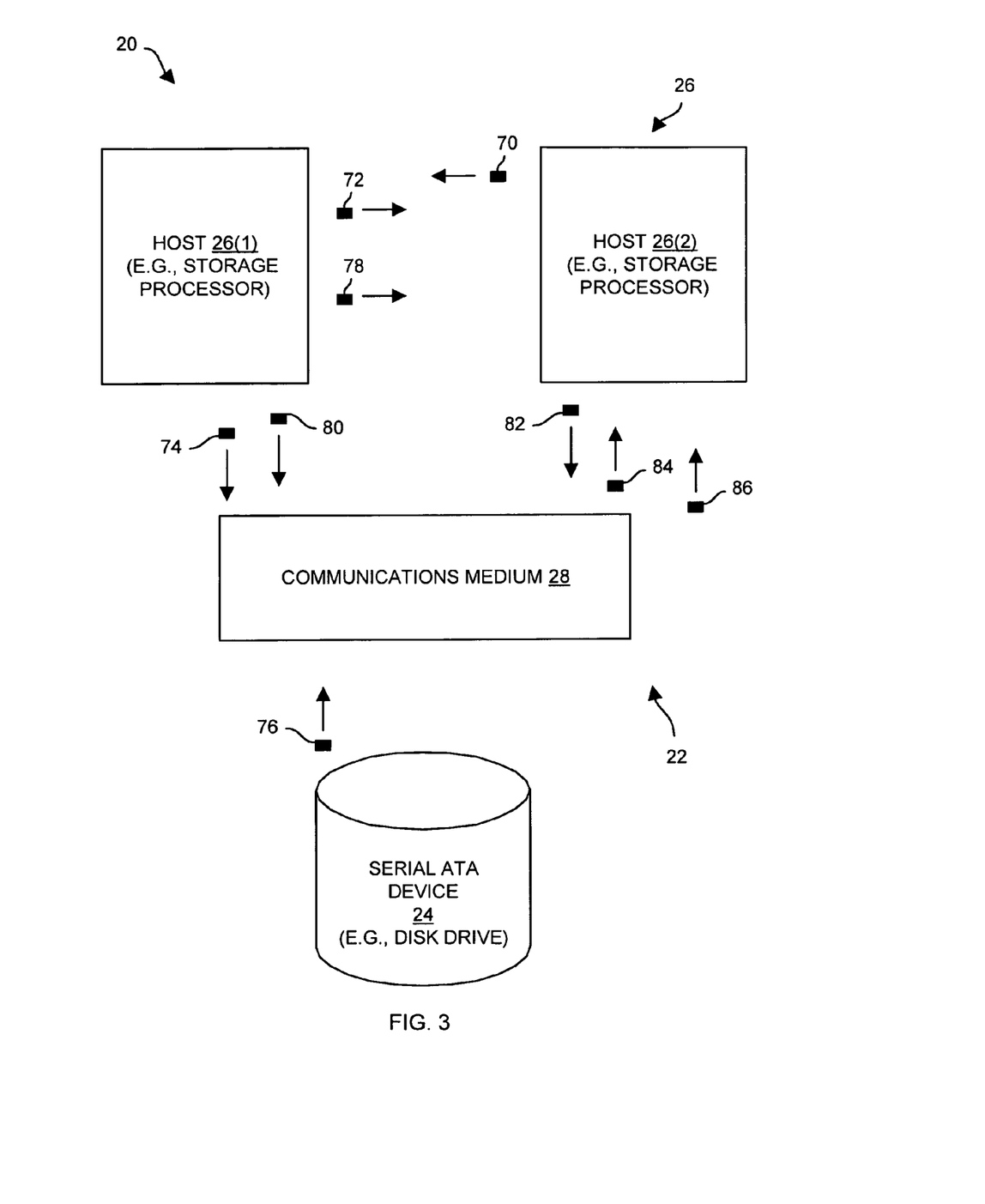
FIG. 3 is a block diagram of particular components of the data storage system of FIG. 1 illustrating control transitioning of a Serial ATA device from a first host to a second host.

FIG. 3 illustrates, by way of example only, transition of control from the host 26(1) to the host 26(2). The following example describes communication between various system components as occurring in the form of messages. However, one of skill in the art will understand that such messages are implementable in a variety of ways such as using differential mode communications signals, common mode communications signals, packets, frames, cells, combinations thereof, etc.

In the example, suppose that both hosts 26(1), 26(2) are concurrently performing data storage operations in an active—active manner for high throughput. In particular, suppose that the host 26(1) presently has control of the Serial ATA device 24 and is in the process of completing a series of load and store operations with the Serial ATA device 24 (over an established communication link or PHY) on behalf of a first external client. Furthermore, suppose that the host 26(2) is in the process of exchanging information with a second external client (e.g., storing changes to data cached within the host 26(2) and now is in need of access to the Serial ATA device 24 (e.g., to synchronize the cached changes with the Serial ATA device 24).

Transition of control from the host 26(1) to the host 26(2) takes places as follows. First, the host 26(2) sends a request 70 for control to the host 26(1) (also see the signal 38(2) in FIG. 1). In response, the host 26(1) sends an acknowledgement 72 to the host 26(2) (also see the signal 38(1) in FIG. 1) and, at an opportune time (e.g., when the host 26(1) has completed its series of operations with no outstanding transactions at the device 24), sends a sleep command 74 (e.g., the PARTIAL command, the SLUMBER command, etc.) to the Serial ATA device 24. The host 26(1) then awaits a completion message 76 from the Serial ATA device 24 to confirm that the Serial ATA device 24 has entered the sleep mode. It should be understood that the host 26(2) is free to continue performing other data storage operations (e.g., with an external client) while the host 26(1) directs the Serial ATA device 24 into the sleep mode. It should be further understood that the Serial ATA device 24 typically provides a completion message (also see the signals 34 and 36(1) in FIGS. 1 and 2) in response to each operation under direction of the host 26(1). Accordingly, the Serial ATA device 24 provides status indicating a successfully completed operation in response to each load and store operation initiated by the host 26(1) as well as a confirming completion message 76 (also see the signals 34, 36(1) and in FIGS. 1 and 2) indicating that it is entering the sleep mode in response to the sleep command 74. At this point, the Serial ATA device 24 enters a lower power dissipation state, and the PHY layer established with the Serial ATA device 24 transitions into a partial power management state or a slumber power management state depending on whether the PARTIAL or SLUMBER sleep command was used.

Upon receipt of the completion message 76, the host 26(1) knows that the Serial ATA device 24 is in the sleep mode thus enabling smooth transition of control from the host 26(1) to the host 26(2) without the need to perform a conventional Serial ATA startup sequence (e.g., without the need to perform a COMRESET sequence). At this point, the host 26(1) sends a notification message 78 to the host 26(2) (also see the signal 38(1) in FIGS. 1 and 2) and a switch message 80 (see the signal 40(1) in FIGS. 1 and 2) to the communications medium 28 to relinquish control of the Serial ATA device 24. When the host 26(2) receives the notification message 78 from the host 26(1), the host 26(2)

knows that it may take over control of the Serial ATA device 24 and the host 26(2) subsequently provides a switch message 82 to the communications medium 28 (also see the signals 40(2) in FIGS. 1 and 2).

In response to the switch messages 80, 82 from the hosts 26 (also see the signals 40 in FIGS. 1 and 2), the control circuit 52 sends the multiplexer signal 64 to the multiplexer 50 to switch the pathways provided by the multiplexer circuit 48. As a result, pathways no longer exist between the host 26(1) and the Serial ATA device 24, but now exist between the host 26(2) and the Serial ATA device 24. Accordingly, the host 26(2) now has control over the Serial ATA device 24. Optionally, the control circuit 52 may be equipped to provide confirmation messages 84 back to the hosts 26 to confirm proper switching of the multiplexer circuit 48 (e.g., see the confirmation message 84 in FIG. 3). Next, the host 26(2) sends a wake command (e.g., the COMWAKE command) to the Serial ATA device 24 through the communications medium 28 to transition the Serial ATA device 24 from the sleep mode back to the normal operating mode (also see the signals 30(2) and 32 in FIGS. 1 and 2). The Serial ATA device 24 responds by transitioning the PHY layer from the lower power management state back to the normal operating state and sends a confirmation message 86 to the host 26(2) through the communications medium 28 (also see signals 34, 36(2) in FIGS. 1 and 2). Accordingly, the communications link (i.e., the PHY) is now re-established between the host 26(2) and the Serial ATA device 24 enabling the host 26(2) to perform a series of data storage operations with the device 24.

As explained above, control of the Serial ATA device 24 transitions from the host 26(1) to the host 26(2) in a smooth and reliable manner. It should be understood that the transition time for such a transition is on the order of a few milliseconds. Accordingly, such a transition is well suited for active—active configurations such as that described above in which short latencies provide fast overall response times by the system 20 as a whole. Further details of how the hosts 26 transition control in the opposite direction (i.e., from the host 26(2) back to the host 26(1)) will now be provided with reference to FIG. 4.

Figure 4:
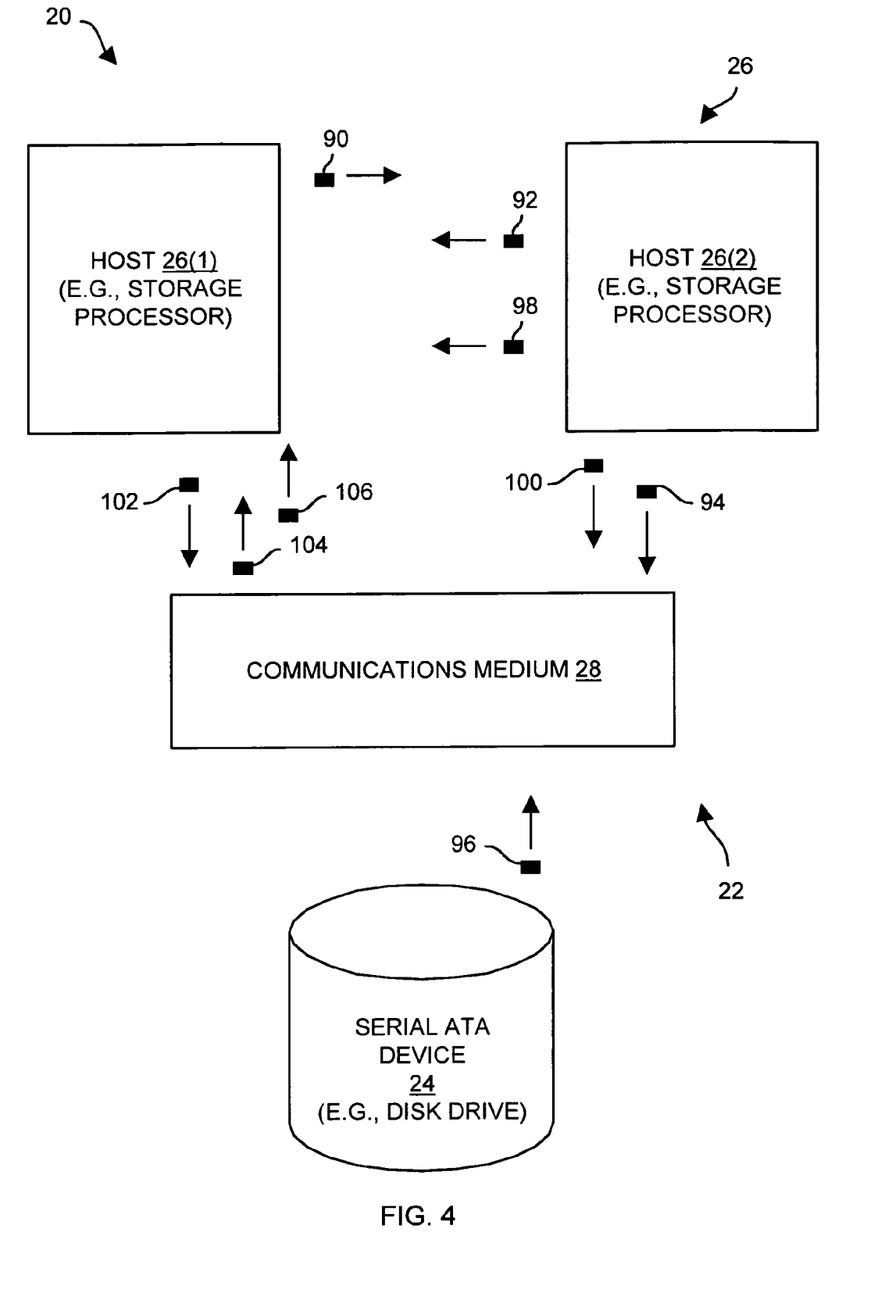
FIG. 4 is a block diagram of particular components of the data storage system of FIG. 1 illustrating control transitioning of the Serial ATA device from the second host back to the first host.

FIG. 4 shows transition of control from the host 26(2) back to the host 26(1). such transition is essential the same as that for transferring control from the host 26(1) to the host 26(2) except that signals exchange occurs in reverse order. In particular, the host 26(1) sends a request 90 for control to the host 26(2) (also see the signal 38(1) in FIG. 1). In response, the host 26(2) sends an acknowledgement 92 to the host 26(1) (also see the signal 38(2) in FIG. 1) and, at an opportune time (e.g., when the host 26(2) has completed its series of operations with no outstanding transactions at device 24), sends a sleep command 94 to the Serial ATA device 24. The host 26(2) then awaits a completion message 96 from the Serial ATA device 24 to confirm that the Serial ATA device 24 has entered the sleep mode. It should be understood that the host 26(1) is free to continue performing other data storage operations (e.g., with an external client) while the host 26(2) directs the Serial ATA device 24 back into the sleep mode. It should be further understood that the Serial ATA device 24 typically provides a completion message (also see the signals 34 and 36(2) in FIGS. 1 and 2) in response to each operation under direction of the host 26(2). Accordingly, the Serial ATA device 24 provides status indicating a successfully completed operation in response to each load and store operation initiated by the host 26(1) as well as a confirming completion message 96 (also see the signals 34, 36(2) in FIGS. 1 and 2) that it is entering the sleep mode in response to the sleep command 94.

Upon receipt of the completion message 96, the host 26(2) knows that the Serial ATA device 24 is in the sleep mode thus enabling smooth transition of control from the host 26(2) back to the host 26(1) without the need to perform a conventional Serial ATA startup sequence (e.g., without the need to perform a COMRESET sequence). At this point, the host 26(2) sends a notification message 98 to the host 26(1) (also see the signal 38(2) in FIGS. 1 and 2) and a switch message 100 to the communications medium 28 to relinquish control of the Serial ATA device 24 (see the signal 40(2) in FIGS. 1 and 2). When the host 26(1) receives the notification message 98 from the host 26(2), the host 26(1) knows that it may take over control of the Serial ATA device 24 and the host 26(1) subsequently provides a switch message 102 to the communications medium 28 (also see the signals 40(1) in FIGS. 1 and 2).

In response to the switch messages 100, 102 from the hosts 26 (also see the signals 40 in FIGS. 1 and 2), the control circuit 52 sends the multiplexer signal 64 to the multiplexer 50 to switch the pathways provided by the multiplexer circuit 48. As a result, pathways no longer exist between the host 26(2) and the Serial ATA device 24, but now exist between the host 26(1) and the Serial ATA device 24. Accordingly, the host 26(1) now has control over the Serial ATA device 24. Optionally, the control circuit 52 may be equipped to provide confirmation messages 84 back to the hosts 26 to confirm proper switching of the multiplexer circuit 48. Next, the host 26(1) sends a wake command to the Serial ATA device 24 through the communications medium 28 to transition the Serial ATA device 24 from the sleep mode back to the normal operating mode (also see the signals 30(1) and 32 in FIGS. 1 and 2). The Serial ATA device 24 responds by sending a confirmation message 106 to the host 26(2) through the communications medium 28 (also see signals 34, 36(1) in FIGS. 1 and 2). A communications link (i.e., PHY) is now established between the host 26(1) and the Serial ATA device 24 enabling the host 26(1) to perform a series of data storage operations with the device 24.

It should be understood that transition of control of the Serial ATA device 24 between hosts 26 was described above as being triggered in response to a particular host 26 requesting access to the Serial ATA device 24. It should be understood that control there are other ways for triggering transition of control of the Serial ATA device 24 such as in response to expiration of a time period (i.e., time multiplex), after completion of a set number of operations (e.g., in a round-robin arbitration scheme), etc. A summary of the operation of the data storage system 20 will now be provided with reference to FIG. 5.

Figure 5:
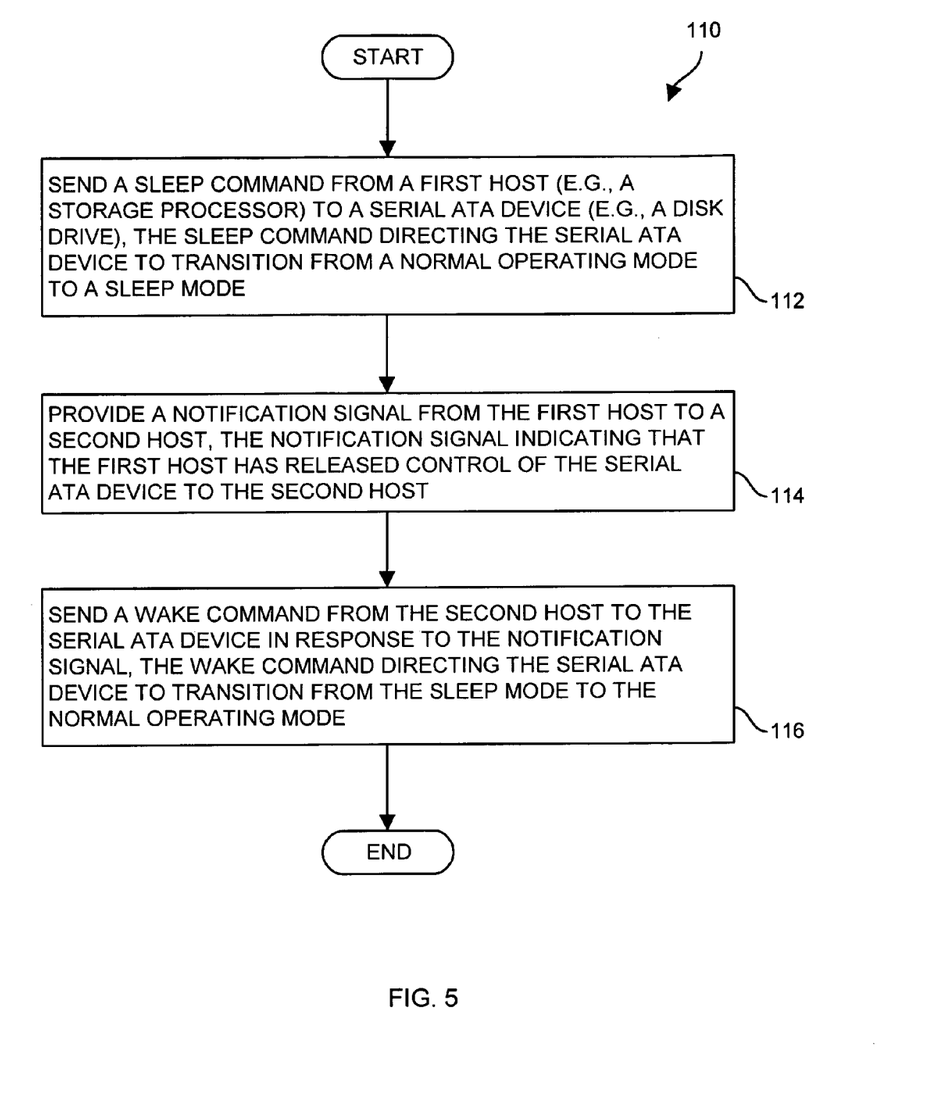
FIG. 5 is a flowchart of a procedure which is performed by the hosts of the data storage system when transitioning control of the Serial ATA device from one host to another.

FIG. 5 is a flowchart of a procedure 110 which is performed by the hosts 26 of the data storage system 20 when transitioning control of the Serial ATA device 24 from a first host 26(1) to another host 26(2). In step 112, a first host 26(1) sends a sleep command 94 to the Serial ATA device 24 through the communications medium 28. The sleep command 94 directs the Serial ATA device 24 to enter a sleep mode from a normal operating mode.

In step 114, the first host 26(1) provides a notification message 98 to the second host 26(2) indicating that the first host 26(1) has released control of the Serial ATA device 24 to the second host 26(2). In particular, the Serial ATA device 24 is now in sleep mode and the multiplexer circuit 48 now provides pathways between the second host 26(2) and the Serial ATA device 24.

In step 116, the second host 26(2) sends a wake command to the Serial ATA device 24 to transition the Serial ATA device 24 from the sleep mode back to the normal operating mode. The Serial ATA device 24 is now under control of the second host 26(2) and is ready to perform data storage operations with the second host 26(2). Such control transition occurs within a few milliseconds thus providing short response times. No Serial ATA startup sequences are necessary that would require hundreds of milliseconds to carry out.

As described above, embodiments of the invention are directed to techniques for transitioning control of a Serial ATA device 24 between multiple hosts 26 using sleep and wake commands that temporarily move the device 24 between a sleep mode and a normal operating mode. Although sleep commands (e.g., "partial", slumber", etc.) are typically prescribed by the Serial ATA interface specification to reduce power consumption/dissipation, the use of such commands for sharing device control within active—active configurations (i) alleviates the need for the Serial ATA device to reinitialize itself, (ii) alleviates the need for a host to reinitialize device features (i.e., a host does not need to set features to the device), and (iii) guarantees the Serial ATA device to be ready in a substantially short amount of time (e.g., 10 microseconds for "partial", 10 milliseconds for "slumber", etc.) in accordance the Serial ATA interface specification.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the Serial ATA device 24 was described above as being a disk drive by way of example only. In other arrangements, the Serial ATA device 24 is a different type of device such as a diskette drive, a tape drive, a CDROM drive, etc.

Additionally, it should be understood that the data storage system 20 was described above as having two hosts 26 by way of example only. In other arrangements, the system 20 has more than two hosts 26 (e.g., three, four, etc.) and the hosts 26 coordinate control over the Serial ATA device using handshaking signals 38 (also see FIG. 1) in ways so that all hosts 26 are guaranteed access to the device 24 (e.g., time division multiplexing, round-robin arbitration, etc.).

Furthermore, it should be understood that the data storage system 20 was described above as having only one Serial ATA device 24 by way of example only. In other arrangements, the system 20 has more than one Serial ATA device 24 (e.g., two, three, etc.). In some arrangements, the system 20 has an array of Serial ATA devices 24. In such arrangements, the hosts 26 preferably have the capability to share control over each Serial ATA device 24 in the manners described above.

What is claimed is:

1. A data storage system, comprising:
a Serial ATA device; and
a control subsystem having a first host, a second host, and a communications medium which interconnects the first and second hosts to the Serial ATA device; the first and second hosts being configured to share control of the Serial ATA device through the communications medium; the first and second hosts, when transitioning control of the Serial ATA device, being configured to:
send a sleep command from the first host to the Serial ATA device, the sleep command directing the Serial ATA device to transition from a normal operating mode to a sleep mode,
provide a notification signal from the first host to the second host, the notification signal indicating that the first host has released control of the Serial ATA device to the second host, and
send a wake command from the second host to the Serial ATA device in response to the notification signal, the wake command directing the Serial ATA device to transition from the sleep mode to the normal operating mode.

2. The data storage system of claim 1 wherein the first host, when providing the notification signal to the second host, is configured to:
receive a completion signal at the first host from the Serial ATA device, the completion signal indicating that the Serial ATA device (i) has completed performance of a set of data storage operations between the first host and the Serial ATA device with no outstanding transactions at the Serial ATA device and (ii) has entered the sleep mode; and
transmit the notification signal from the first host to the second host following receipt of the completion signal at the first host.

3. The data storage system of claim 2 wherein the communications medium includes:
a multiplexer circuit configured to transition control of the Serial ATA device between the first and second hosts; the multiplexer circuit having a first selectable port connected to the first host, a second selectable port connected to the second host, common port connected to the Serial ATA device, and a control interface connected to both the first host and the second host; the multiplexer circuit, when transitioning control of the Serial ATA device from the first host to the second host, being configured to:
receive a first multiplexer control signal from the first host through the control interface;
receive a second multiplexer control signal from the second host through the control interface; and
switch connection of the common port from the first selectable port to the second selectable port in response to the first and second multiplexer control signals.

4. The data storage system of claim 1 wherein the second host, while the first host sends the sleep command to the Serial ATA device, is configured to:
exchange data storage communications with an external client.

5. The data storage system of claim 1 wherein the first host, while the second host sends the wake command to the Serial ATA device, is configured to:
exchange data storage communications with an external client.

6. The data storage system of claim 1 wherein the first and second hosts are further configured to:
after a set of data storage operations is performed between the second host and the Serial ATA device with no outstanding transactions at the Serial ATA device, send another sleep command from the second host to the Serial ATA device, the other sleep command directing the Serial ATA device to transition from the normal operating mode to the sleep mode;
provide another notification signal from the second host to the first host, the other notification signal indicating that the second host has released control of the Serial ATA device to the first host; and send another wake command from the first host to the Serial ATA device in response to the other notification signal, the other wake command directing the Serial ATA device to transition from the sleep mode to the normal operating mode.

7. A data storage system, comprising:

a Serial ATA device; and a control subsystem having a first host, a second host, and a communications medium which interconnects the first and second hosts to the Serial ATA device; the first and second hosts being configured to share control of the Serial ATA device through the communications medium; the first and second hosts including:

means for sending a sleep command from the first host to the Serial ATA device, the sleep command directing the Serial ATA device to transition from a normal operating mode to a sleep mode, means for providing a notification signal from the first host to the second host, the notification signal indicating that the first host has released control of the Serial ATA device to the second host, and means for sending a wake command from the second host to the Serial ATA device in response to the notification signal, the wake command directing the Serial ATA device to transition from the sleep mode to the normal operating mode.

8. A control subsystem for a data storage system, the control subsystem comprising:

a first host;

a second host; and a communications medium which is configured to connect the first and second hosts to a Serial ATA device; the first and second hosts being configured to share control of the Serial ATA device through the communications medium when the communications medium connects the first and second hosts to the Serial ATA device; the first and second hosts, when transitioning control of the Serial ATA device, being configured to:

send a sleep command from the first host to the Serial ATA device, the sleep command directing the Serial ATA device to transition from a normal operating mode to a sleep mode, provide a notification signal from the first host to the second host, the notification signal indicating that the first host has released control of the Serial ATA device to the second host, and send a wake command from the second host to the Serial ATA device in response to the notification signal, the wake command directing the Serial ATA device to transition from the sleep mode to the normal operating mode.

9. The control subsystem of claim 8 wherein the first host, when providing the notification signal to the second host, is configured to:

receive a completion signal at the first host from the Serial ATA device, the completion signal indicating that the Serial ATA device (i) has completed performance of a set of data storage operations between the first host and the Serial ATA device with no outstanding transactions at the Serial ATA device and (ii) has entered the sleep mode; and transmit the notification signal from the first host to the second host following receipt of the completion signal at the first host.

10. The control subsystem of claim 9 wherein the communications medium includes:

a multiplexer circuit configured to transition control of the Serial ATA device between the first and second hosts; the multiplexer circuit having a first selectable port connected to the first host, a second selectable port connected to the second host, common port connected to the Serial ATA device, and a control interface connected to both the first host and the second host; the multiplexer circuit, when transitioning control of the Serial ATA device from the first host to the second host, being configured to:

receive a first multiplexer control signal from the first host through the control interface;

receive a second multiplexer control signal from the second host through the control interface; and switch connection of the common port from the first selectable port to the second selectable port in response to the first and second multiplexer control signals.

11. The control subsystem of claim 8 wherein the second host, while the first host sends the sleep command to the Serial ATA device, is configured to:

exchange data storage communications with an external client.

12. The control subsystem of claim 8 wherein the first host, while the second host sends the wake command to the Serial ATA device, is configured to:

exchange data storage communications with an external client.

13. The control subsystem of claim 8 wherein the first and second hosts are further configured to:

after a set of data storage operations is performed between the second host and the Serial ATA device with no outstanding transactions at the Serial ATA device, send another sleep command from the second host to the Serial ATA device, the other sleep command directing the Serial ATA device to transition from the normal operating mode to the sleep mode;

provide another notification signal from the second host to the first host, the other notification signal indicating that the second host has released control of the Serial ATA device to the first host; and send another wake command from the first host to the Serial ATA device in response to the other notification signal, the other wake command directing the Serial ATA device to transition from the sleep mode to the normal operating mode.

14. A control subsystem for a data storage system, the control subsystem comprising:

a first host;

a second host; and a communications medium which is configured to connect the first and second hosts to a Serial ATA device; the first and second hosts being configured to share control of the Serial ATA device through the communications medium when the communications medium connects the first and second hosts to the Serial ATA device; the first and second hosts including:

means for sending a sleep command from the first host to the Serial ATA device, the sleep command directing the Serial ATA device to transition from a normal operating mode to a sleep mode, means for providing a notification signal from the first host to the second host, the notification signal indicating that the first host has released control of the Serial ATA device to the second host, and means for sending a wake command from the second host to the Serial ATA device in response to the notification signal, the wake command directing the Serial ATA device to transition from the sleep mode to the normal operating mode.

15. In a Serial ATA communications system having a first host, a second host and a Serial ATA device, a method for transitioning control of the Serial ATA device between hosts, the method comprising:

sending a sleep command from the first host to the Serial ATA device, the sleep command directing the Serial ATA device to transition from a normal operating mode to a sleep mode;

providing a notification signal from the first host to the second host, the notification signal indicating that the first host has released control of the Serial ATA device to the second host; and sending a wake command from the second host to the Serial ATA device in response to the notification signal, the wake command directing the Serial ATA device to transition from the sleep mode to the normal operating mode.

16. The method of claim 15 wherein providing the notification signal from the first host to the second host includes:

receiving a completion signal at the first host from the Serial ATA device, the completion signal indicating that the Serial ATA device (i) has completed performance of a set of data storage operations between the first host and the Serial ATA device with no outstanding transactions at the Serial ATA device and (ii) has entered the sleep mode; and transmitting the notification signal from the first host to the second host following receipt of the completion signal at the first host.

17. The method of claim 16 wherein a multiplexer circuit include a first selectable port connected to the first host, a second selectable port connected to the second host, common port connected to the Serial ATA device, and a control interface connected to both the first host and the second host; and wherein the method further comprises:

receiving a first multiplexer control signal from the first host through the control interface;

receiving a second multiplexer control signal from the second host through the control interface; and switching connection of the common port from the first selectable port to the second selectable port in response to the first and second multiplexer control signals.

18. The method of claim 15, further comprising:

exchanging data storage communications between the second host and an external client while sending the sleep command from the first host to the Serial ATA device.

19. The method of claim 15, further comprising:

exchanging data storage communications between the first host and an external client while sending the wake command from the second host to the Serial ATA device.

20. The method of claim 15, further comprising:

after a set of data storage operations is performed between the second host and the Serial ATA device with no outstanding transactions at the Serial ATA device, sending another sleep command from the second host to the Serial ATA device, the other sleep command directing the Serial ATA device to transition from the normal operating mode to the sleep mode;

providing another notification signal from the second host to the first host, the other notification signal indicating that the second host has released control of the Serial ATA device to the first host; and sending another wake command from the first host to the Serial ATA device in response to the other notification signal, the other wake command directing the Serial ATA device to transition from the sleep mode to the normal operating mode.

* * * * *